United States Patent Office 2,998,229
Patented Aug. 29, 1961

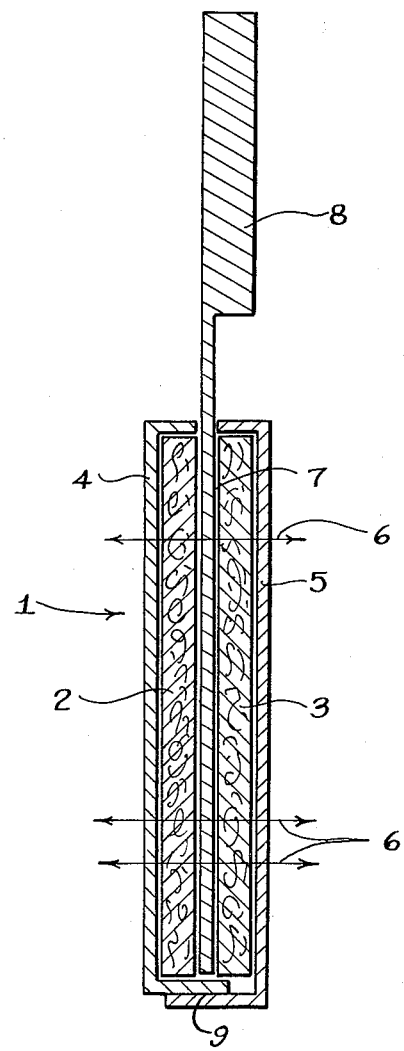

2,998,229
INSULATION
Sherman A. Tompkins, New York, N.Y., assignor to Johns-Manville Corporation, New York, N.Y., a corporation of New York
Filed Dec. 16, 1958, Ser. No. 780,728
1 Claim. (Cl. 257—263)

This invention relates to the combination of a thermal insulating material with a heat sink and is particularly adapted for those installations in which extreme transient conditions are encountered. An example of such operating conditions occurs in a rocket engine nozzle where there are extreme temperature differentials between the faces of a metal-encased insulation. Under such conditions there is required an insulation having low thermal conductivity and high heat capacity which is ordinarily not available in the relatively thin homogeneous materials commonly used for such insulation purposes.

It is an object of this invention to provide a relatively thin insulation having low thermal conductivity and high heat capacity.

The foregoing object is accomplished in accordance with the instant invention by a high conductivity plate which is inserted between adjacent layers of a lightweight thermal insulation such as those used in rocket engine nozzles, wherein the insulation is inclosed within a metal jacket. At such locations, there are extremely high temperature differentials between the faces of the metal-encased insulation. The high conductivity plate is thermally connected to a heat sink located outside the immediate zone of the high temperature, so that the heat flow from the excessive temperatures may be readily dissipated. The term, plate, as used in the specification and claims is meant to include any desired sheet-like configuration and may be of increasing taper from the free end toward the end adjacent the heat sink. In this manner there is provided an insulation having a low thermal conductivity and a high heat capacity.

The invention will be more fully understood and further objects and advantages thereof will become apparent when reference is made to the following detailed description of the preferred embodiment of the invention and the accompanying drawing.

In the single figure of the drawing there is schematically illustrated an insulation 1 which comprises a pair of adjacent layers 2 and 3 of insulating material having a low thermal conductivity. The layers 2 and 3 of insulating material are preferably encased within a protective jacket having faces 4 and 5 exposed to areas of differing temperature. The general direction of heat flow through the insulation is illustrated by the arrows 6. A metal plate 7 of high thermal conductivity is interposed between the layers 2 and 3 of insulating material and lies in a plane extending normal to the direction of the heat flow through the layers 2 and 3 of insulating material. The plate 7 may be in contact with or slightly spaced from the layers 2 and 3 of insulating material. The metal plate 7 is connected to a metal heat sink 8 which is located in an area spaced from that of the required temperature zone and wherein the heat may be readily dissipated, stored or used for other purposes. The layers 2 and 3 of insulating material and the metal plate 7 may be of any configuration desired and are shaped so as to fit the place of installation. Also, the plate 7 and the heat sink 8 may be of metal as stated or any other material having a high thermal conductivity and not harmfully affected by the temperature encountered.

In operation, heat which would ordinarily flow through the layers 2 and 3 of insulating material follows the path of least resistance and flows through the plate 7 to the heat sink 8 where it may be stored, dissipated or used as desired. The thickness and thermal conductivity of the plate 7 is determined by the temperature differential to be encountered and the relative time of its duration. The thickness of the insulation is also dependent upon the operational characteristics. Also, the size of the heat sink 8 is dependent upon the operating characteristics of its particular installation. The protective jacket may be of any desired material but in the preferred embodiment illustrated in the drawing is made from a chrome-nickel steel such as marketed by the International Nickel Company under the trade name Inconel having a thickness of .004". Because of the relatively low gauge of the material, very little heat will be conducted through the lap joint 9 between the faces of the protective cover. Each insulation in the preferred embodiment is a refractory fiber felt, ¼" in thickness.

It is to be noted that the invention is particularly directed to those installations where size and weight is of extreme importance and where the temperature differentials encountered are unusually large though often of relatively short duration. In one such installation the hot side, for example, face 4 was exposed to a temperature of 2000° F. for 75 seconds wherein the insulation was required to limit the rate of temperature rise on the cool side, for example, face 5, to a temperature of 300° F. in 300 seconds. The layers 2 and 3 of insulating material would not be capable of functioning under such conditions but the combination of the layers 2 and 3 of insulating material with the plate 7 of high thermal conductivity to the heat sink 8 functioned to maintain the temperature within the prescribed limits. The metal plate 7 may be placed on either side of the layers 2 and 3 of insulating material but is preferably inserted between adjacent layers 2 and 3. Although particularly useful in controlling temperature changes under unusually large transient conditions, the insulation of the present invention may also be used under conditions of thermal equilibrium to control surface temperatures or the internal temperature of the insulating medium.

While the invention has been described in rather full detail, it will be understood that these details need not be strictly adhered to and that various changes and modifications may suggest themselves to one skilled in the art, all falling within the scope of the invention as defined by the subjoined claim.

What I claim is:

A thermal insulation for use in extreme transient conditions comprising in combination a plurality of layers of insulating material having low thermal conductivity, said plurality of layers being positioned to form a thermal insulation having a first side adapted to be positioned adjacent an area of relatively high temperatures and a second side adapted to be positioned adjacent an area of relatively low temperatures, one of said layers of insulating material forming said first side and another of said layers of insulating material forming said second side, a plate having high thermal conductivity and positioned between adjacent layers of said insulating material, said plate lying in a plane extending normal to the direction of heat flow through said layers of insulating material, a heat sink connected to said plate to dissipate a quantity of the heat flowing through said thermal insulation from the first side thereof to the second side thereof and wherein said plate cooperates with said layers of insulating material to limit the temperature rise of said second side within predetermined time intervals.

References Cited in the file of this patent
UNITED STATES PATENTS

| | | |
|---|---|---|
| 2,296,033 | Heller | Sept. 15, 1942 |
| 2,840,350 | Pierce | June 24, 1958 |
| 2,849,860 | Lowe | Sept. 2, 1958 |